United States Patent
Rice et al.

(10) Patent No.: US 9,790,808 B2
(45) Date of Patent: Oct. 17, 2017

(54) MOBILE ON-WING ENGINE WASHING AND WATER RECLAMATION SYSTEM

(75) Inventors: Robert M. Rice, Huntsville, AL (US); Robert J. Tierney, Glastonbury, CT (US)

(73) Assignee: EcoServices, LLC, Wethersfield, CT (US)

(*) Notice: Subject to any disclaimer, the term of this patent is extended or adjusted under 35 U.S.C. 154(b) by 1882 days.

(21) Appl. No.: 11/098,064

(22) Filed: Apr. 4, 2005

(65) Prior Publication Data
US 2006/0219269 A1  Oct. 5, 2006

(51) Int. Cl.
| | |
|---|---|
| *B08B 7/04* | (2006.01) |
| *B08B 3/04* | (2006.01) |
| *B64F 5/00* | (2017.01) |
| *F01D 25/00* | (2006.01) |
| *B08B 3/02* | (2006.01) |
| *B08B 3/14* | (2006.01) |
| *B08B 9/00* | (2006.01) |
| *B08B 17/00* | (2006.01) |
| *B64F 5/30* | (2017.01) |

(52) U.S. Cl.
CPC ............ *F01D 25/002* (2013.01); *B08B 3/02* (2013.01); *B08B 3/14* (2013.01); *B08B 9/00* (2013.01); *B08B 17/00* (2013.01); *B64F 5/30* (2017.01); *F05D 2220/74* (2013.01); *Y02P 70/585* (2015.11)

(58) Field of Classification Search
CPC .. B08B 9/00; B08B 17/00; B08B 3/02; B08B 3/14; F01D 25/002; F05D 2220/74; B64F 5/0018; B64F 5/30; Y02P 70/585; Y02T 50/90

USPC ... 134/104.4, 104.2, 10, 22.1, 22.18, 32, 33, 134/98; 415/1, 115, 116, 117
See application file for complete search history.

(56) References Cited

U.S. PATENT DOCUMENTS

| | | | | |
|---|---|---|---|---|
| 1,772,037 | A | * 8/1930 | Bradshaw | ...................... 122/491 |
| 2,575,568 | A | * 11/1951 | Topanelian, Jr. | ................ 96/217 |
| 4,059,123 | A | 11/1977 | Bartos et al. | |
| 4,234,323 | A | 11/1980 | Maher | |
| 4,543,108 | A | * 9/1985 | Wurz | .............................. 95/272 |
| 5,011,540 | A | 4/1991 | McDermott | |

(Continued)

FOREIGN PATENT DOCUMENTS

| | | |
|---|---|---|
| CA | 2506174 | 12/2005 |
| JP | 6287785 A | 10/1994 |

(Continued)

OTHER PUBLICATIONS

International Preliminary Report on Patentability dated Oct. 18, 2007.

*Primary Examiner* — Douglas Lee
(74) *Attorney, Agent, or Firm* — Westman, Champlin & Koehler, P.A.

(57) ABSTRACT

A system for on-wing engine washing and water reclamation is provided. The system has at least one spray device for introducing a cleaning liquid containing at least water into the engine while the engine is being operated, and an effluent trough for collecting the cleaning liquid from an exit end or underneath side of the engine. In a preferred embodiment, a source of the cleaning liquid and the effluent trough are located on a mobile unit. Further, a treatment system for treating the collected cleaning liquid is also located on a mobile unit.

16 Claims, 4 Drawing Sheets

(56) References Cited

U.S. PATENT DOCUMENTS

| | | | |
|---|---|---|---|
| 5,698,043 A * | 12/1997 | Acevedo | 134/10 |
| 5,868,860 A * | 2/1999 | Asplund | 134/22.1 |
| 5,899,217 A * | 5/1999 | Testman, Jr. | 134/104.4 |
| 6,073,637 A * | 6/2000 | Hayward et al. | 134/22.1 |
| 6,565,758 B1 * | 5/2003 | Thomas | 210/776 |
| 6,648,939 B2 * | 11/2003 | Neuschwander et al. | 55/423 |
| 7,185,663 B2 | 3/2007 | Koch et al. | |
| 2002/0088480 A1 * | 7/2002 | Woodmansee et al. | 134/22.13 |
| 2003/0209256 A1 * | 11/2003 | Tadayon | 134/10 |

FOREIGN PATENT DOCUMENTS

| | | |
|---|---|---|
| JP | 2001232309 A | 8/2001 |
| WO | WO 2005/120953 | 12/2005 |
| WO | WO 2005/121509 * | 12/2005 |
| WO | 2008025940 A1 | 3/2008 |
| WO | 2009106792 A1 | 9/2009 |
| WO | 2009129788 A2 | 10/2009 |

* cited by examiner

MOBILE ON-WING ENGINE WASHING AND WATER RECLAMATION SYSTEM

BACKGROUND OF THE INVENTION (1) Field of the Invention

The present invention relates to a mobile on-wing engine washing system having a mobile unit for reclaiming water used to wash the engine.

(2) Prior Art

Jet engine efficiencies are reduced due to environmental contamination buildup in the engine components. Compressor blades and vanes can suffer from the accumulation of hydrocarbon deposits, dirt, salt, and corrosion residues, affecting their aerodynamic performance. These deposits can increase exhaust gas temperature and fuel use and decrease the engine's surge margin.

Many operators report good success in performance recovery using water wash procedures on a regular basis. The washing process involves cyclic washing of the engine with large amounts of water and sometimes, a small amount of detergent. The engine is motored at approximately 20% rpm during washing. Water wash procedures are currently performed in fixed hangar installations where the wastewater is collected and disposed of.

The effects of water wash are highly operator specific, based on such things as operating environment, time prior to first washing, and interval between washes. Once a deposited contaminant hardens or the amount becomes excessive, then the effectiveness of a water wash becomes reduced or possibly ineffective. Therefore, water washing should be performed frequently (around 750 hours). The cleanliness of the compressors may be noted during maintenance periods to determine if the wash interval used is effective.

SUMMARY OF THE INVENTION

Accordingly, it is an object of the present invention to provide a system and a process for washing engines which allows engine operators to clean their engines more frequently without significantly impacting aircraft availability.

It is a further object of the present invention to provide a system and process as above which can be performed on-wing using mobile technology, while still complying with relevant environmental considerations and regulations.

It is still a further object of the present invention to provide a system and process as above which does not require valuable hangar time.

The foregoing objects are attained by the system and the process of the present invention.

In accordance with the present invention, a system for engine washing and water reclamation is provided. The system broadly comprises means for operating an engine, means for introducing a cleaning liquid containing at least water into the engine while the engine is being operated, and mobile means for collecting the cleaning liquid from an exit end of the engine and from underneath the engine.

Further in accordance with the present invention, a process for on-wing engine washing and water reclamation is provided. The process broadly comprises the steps of initiating operation of an engine, introducing a cleaning liquid containing at least water into the engine while the engine is operating, and collecting the cleaning liquid from an exit end of the engine and from underneath the engine onto a mobile unit.

Other details of the mobile on-wing engine washing and water reclamation system, as well as other objects and advantages attendant thereto, are set forth in the following detailed description and the accompanying drawings, wherein like reference numerals depict like elements.

BRIEF DESCRIPTION OF THE DRAWING(S)

DETAILED DESCRIPTION OF THE PREFERRED EMBODIMENT(S)

Figure 1:
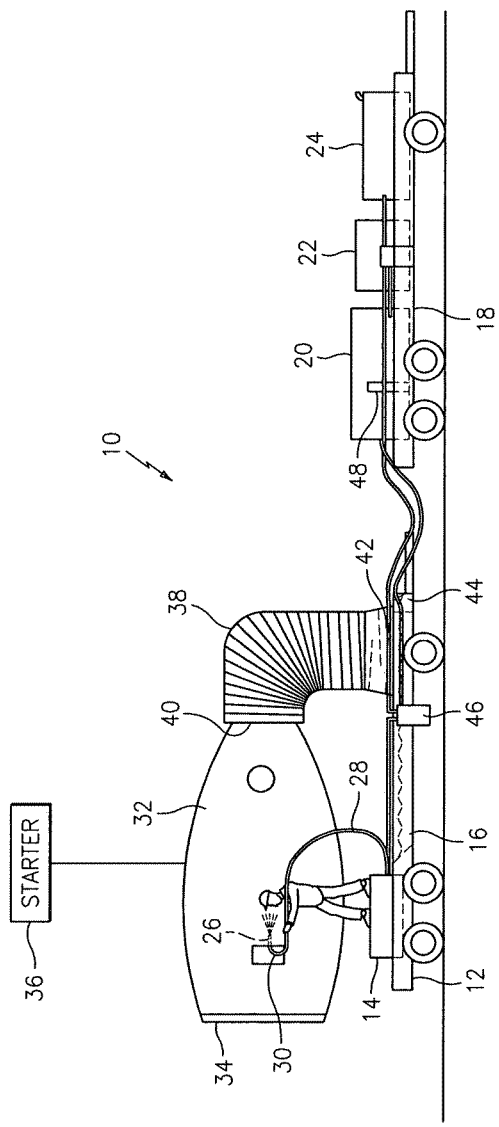
FIG. 1 illustrates a mobile on-wing engine washing and water reclamation system in accordance with the present invention.
Figure 2:
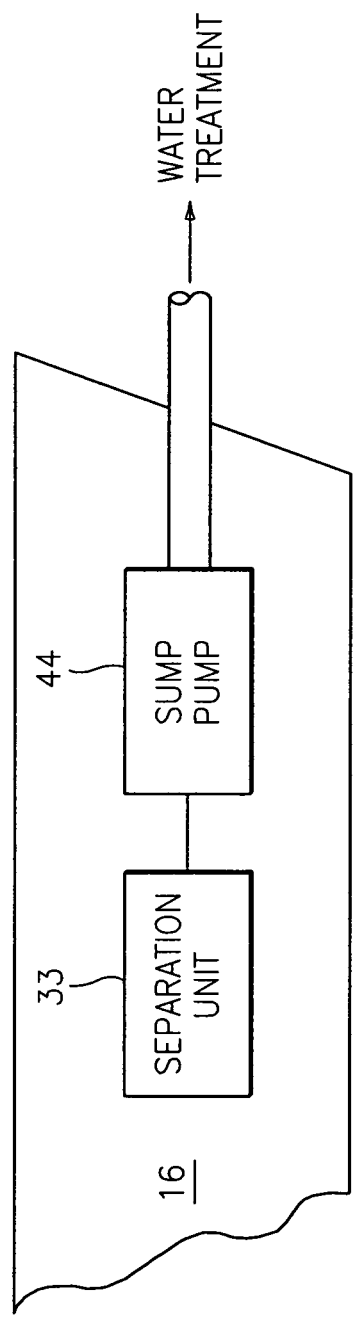
FIG. 2 is a schematic representation of a portion of an effluent trough used in the system of FIG. 1.

Referring now to FIGS. 1 and 2, there is shown a mobile on-wing engine washing and water reclamation system 10 in accordance with the present invention. The system 10 includes a mobile unit 12 on which there is located a source 14 of cleaning liquid and a used cleaning liquid collection trough or effluent trough 16. The system 10 also includes a second mobile unit 18 on which there is located a water treatment unit 20, a collection tank 22, and a generator 24 for mobile power production. While the trough 16 has been shown as being on mobile unit 12, it could be located on the second mobile unit 18 or on yet another mobile unit.

The cleaning liquid source 14 may contain water by itself or water mixed with an appropriate detergent. The detergent may comprise any suitable detergent known in the art in any suitable concentration. The particular type of detergent used, if any, depends on the type of contaminants, dirt, etc. to be removed. The cleaning liquid source 14 may comprise a wash unit with a pump, a heater, and a tank.

Figure 7:
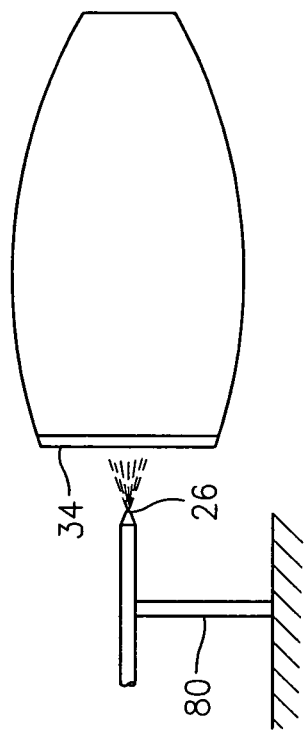
FIG. 7 illustrates a spray applicator connected to a support structure.

The cleaning liquid source 14 is connected to a solution applicator 26, such as one or more spray nozzles, by a hose or tubing 28. In one embodiment of the present invention, the solution applicator 26 may be located at the end of a shepherd's tool 30. In another embodiment, the solution applicator 26 may be part of a flexible or fixed support structure 80 (see FIG. 7). A suitable pump (not shown) may be provided in the source 14 or elsewhere on the unit 12 or unit 18 to generate a pressurized flow of the cleaning liquid through the applicator 26.

The spray applicator may have a single nozzle or multiple nozzles. If nozzles are used, one or more nozzles may introduce the cleaning liquid into the compressor and one or more nozzles may introduce the cleaning liquid onto the fan section.

The spray applicator 26 may be inserted into a portion of an on-wing engine 32 to be cleaned. Preferably, the spray applicator 26 is positioned so that the cleaning liquid flows into a compressor section of the engine 32. The fan area of the engine 32 may or may not be washed.

In a preferred embodiment of the present invention, the cleaning liquid is introduced into the on-wing engine 32 while the engine 32 is operating or motoring. The engine 32 may be motored or operated using a starter 36. The starter 36 may be a starter onboard the aircraft (not shown) or may be attached to the mobile units 12 or 18. The engine is preferably motored by the starter at about 20% N2. This allows the cleaning liquid to be ingested by the engine 32 into the fan area and/or the compressor section. The cleaning liquid will pass through the entire engine from the compressor section throughout the turbine section to the exhaust section.

Figure 3:
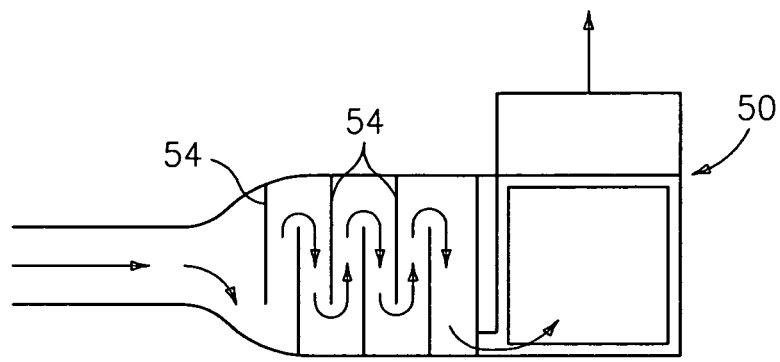
FIG. 3 illustrates a diversion ducting system which may be employed in the system of FIG. 1.

Cleaning liquid which has passed through the engine may be collected into the trough 16 via a collection conduit 38 connected to the exit end or exhaust nozzle 40 of the engine 32. The conduit 38 has an outlet 42 that deposits the collected cleaning liquid into the trough 16. Preferably, the trough 16 is positioned beneath the engine 32. The collection method may include a diversion ducting system 50 such as shown in FIG. 3 which captures the air/water effluent and separates the droplets from the air flow. "Diversion ducting" refers to ducting the air flow through a series of "diversion" plates 54 so that the water droplets impact the plates 54 and fall out of the air stream. "Diversion ducting" is a method of achieving "inertial separation". The water droplets exiting the diversion ducting system 50 may be collected in the trough 16 or elsewhere for treatment.

Figure 4:
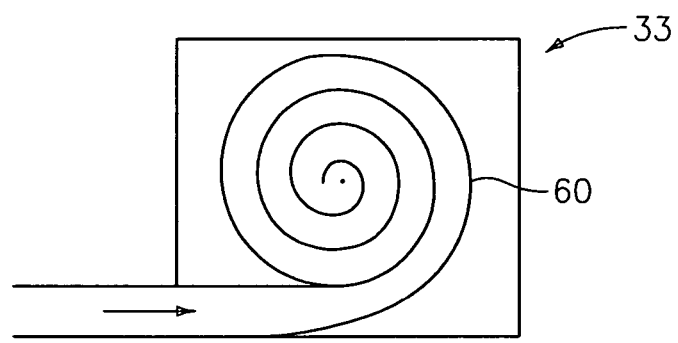
FIG. 4 illustrates a centrifugal separation unit which may be used in the system of FIG. 1.

There are many ways to separate water droplets from the air streams exiting the engine 32. These other ways include, but are not limited to, filters, gutters, directional changes, etc. Centrifugal separation is also a method of inertial separation but "spins" or "throws" out the droplets by channeling the airflow around a curved surface 60 as shown in FIG. 4 thus causing the droplets to impact the curved surface and then fall out of the air stream.

In an alternative method of solution application, an applicator 26 that washes both fan and compressor may be introduced into the engine inlet 34.

Figure 5:
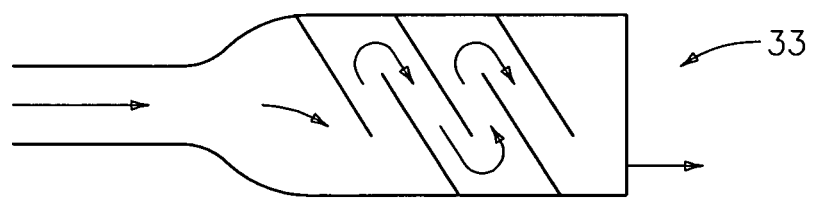
FIG. 5 illustrates an inertial separation unit which may be used in the system of FIG. 1.

Referring now to FIG. 2, an inertial or centrifugal separation unit 33 may be used to perform air/water separation. The inertial separation unit when used may comprise any suitable inertial separation unit known in the art such as that shown in FIG. 5. Similarly, the centrifugal separation unit, when used, may comprise any suitable centrifugal separation unit known in the art such as that shown in FIG. 4.

The mobile unit 12 has a pump 44, such as a sump pump, for conveying collected cleaning liquid from the trough 16 to the water treatment unit 20. A power distribution device 46 may be provided on the unit 12 or unit 18. The power distribution device 46 is connected to the generator 24 and may be used to power the pump 44 and/or the pump (not shown) for generating the spray of cleaning liquid.

The water treatment unit 20 may comprise any suitable water treatment unit known in the art. Preferably, the water treatment unit 20 includes a filter 48 for removing solid particulates and oils. The water treatment unit 20 may also include means for treating the collected liquid to remove dissolved solids.

The filtered and treated water is reclaimed and collected in the collection tank 22. The reclaimed water in the tank 22 may be pumped to the cleaning liquid source 14 using a suitable hose and pump arrangement and used as the base cleaning liquid.

The volume of water used to clean the engine varies by engine size and type. Generally, from about 30 to 60 gallons of water will be used per engine.

While the system has been shown as including two mobile units, it should be recognized that the system could be placed on a single mobile cart or three carts if desired. The emphasis is upon mobility, flexibility for a variety of engines, and independent operation.

The system and process of the present invention provide a number of advantages. First, engine operators can clean their engines more frequently without significantly impacting aircraft availability. Second, engine efficiency can be increased due to more frequent cleaning. Third, the cleaning procedure can be performed on-wing since it involves mobile technology. Fourth, valuable hangar time is not required. Fifth, the system takes advantage of environmental friendly, waste water collection, and re-circulation. Sixth, there is no water disposal costs due to recycling. Seventh, the system provides quick turn-time and a low impact cleaning process. Eighth, the system and the process are economically desirable because of greatly reduced cleaning costs and improved quality.

Figure 6:
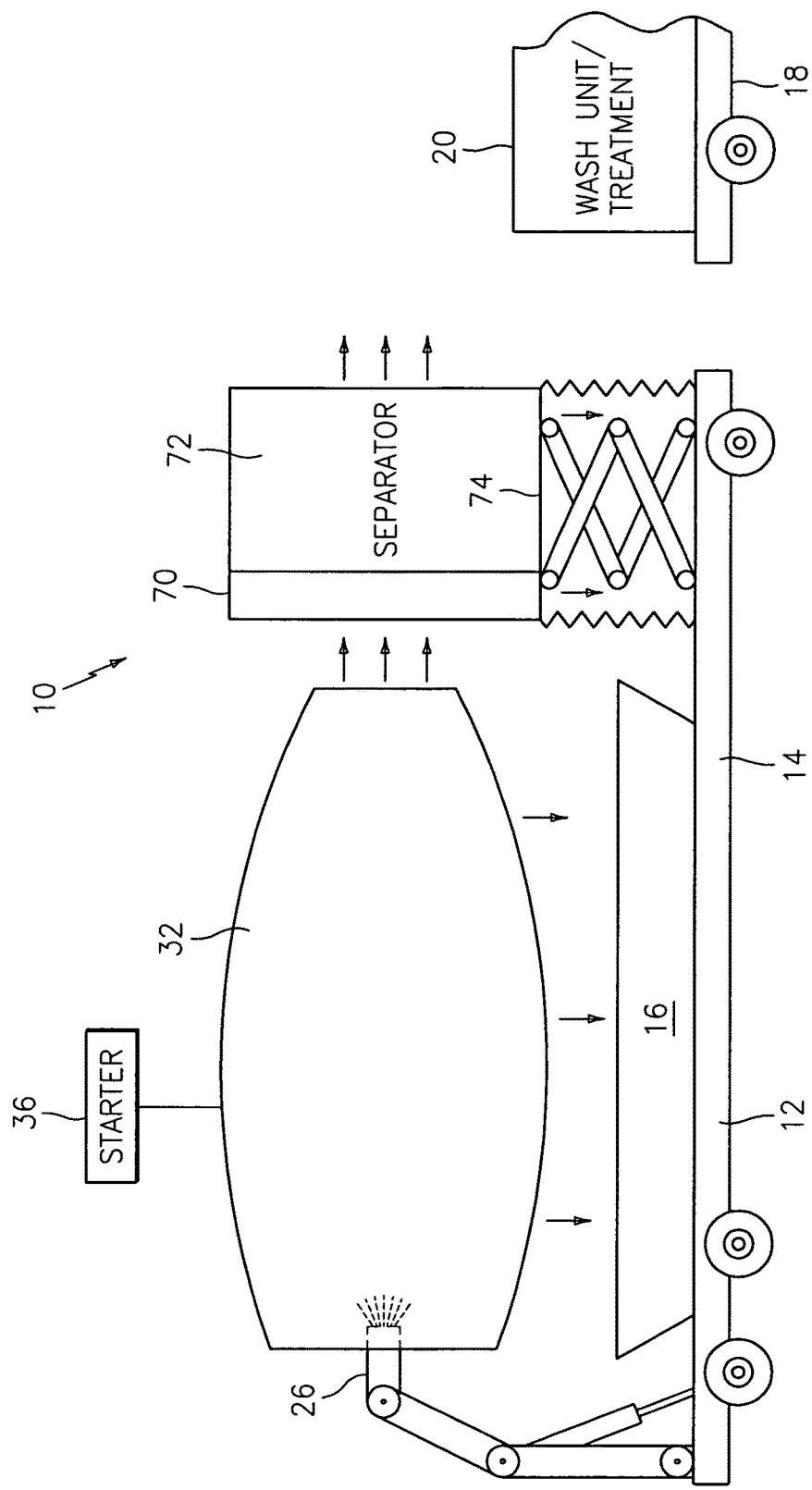
FIG. 6 illustrates an alternative embodiment of a mobile on-wing engine washing and water reclamation system.

While the system of FIG. 1 has been shown as including a conduit 38, the conduit may be omitted if desired. In such a case, the air/water exiting the engine 32 collects in the trough 16 positioned underneath the engine 32. A collection duct or device 70 which is not connected to the engine 32, as shown in FIG. 6, may be used to further collect the air/water exiting the engine. The duct or device 70 may be provided with a suitable means 72 for droplet separation, such as a diversion ducting unit, an inertial separation unit, or a centrifugal separation unit. The duct or device 70 may have an outlet 74 for allowing collected liquid to flow into tank 14.

It is apparent that there has been provided in accordance with the present invention a mobile on-wing engine washing and water reclamation system which fully satisfies the objects, means, and advantages set forth hereinbefore. While the present invention has been described in connection with specific embodiments thereof, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. A system for on-wing engine washing and water reclamation, said system comprising:
   means for introducing a cleaning liquid containing at least water into an engine while said engine is being operated and is uncovered;
   mobile means for collecting said cleaning liquid from an exit end of said engine and from underneath said engine;
   said mobile collecting means comprising a cart having an open effluent trough positioned directly beneath said engine to collect cleaning liquid from said exit end of said engine via a collection conduit connected to an exhaust nozzle of the engine and having an outlet that deposits the collected cleaning fluid into the effluent trough and to collect in a hoseless manner cleaning fluid coming off an underneath portion of the engine, wherein the collection conduit comprises an inertial separation system for separating the entrained cleaning liquid from said airstream and for depositing said separated entrained cleaning liquid into the effluent trough; and
   said means for introducing a cleaning liquid includes a cleaning liquid source mounted on said cart.

2. A system according to claim 1, wherein said cleaning liquid introducing means comprises means for introducing a cleaning liquid containing water and detergent.

3. A system according to claim 1, wherein said cleaning liquid introducing means comprises at least one spray nozzle.

4. A system according to claim 1, wherein said cleaning liquid introducing means comprises at least two nozzles, with a first or multiple nozzles injecting cleaning fluid onto a compressor of the engine, and a second or multiple nozzles depositing cleaning fluid onto a fan section of the engine.

5. A system according to claim 1, wherein said cleaning liquid introducing means comprises a shepherd's hook tool having a spray nozzle.

6. A system according to claim 1, wherein said cleaning liquid introducing means comprises a flexible or fixed support structure having at least one spray nozzle.

7. A system according to claim 1, wherein said cleaning liquid introducing means comprises means for causing said cleaning liquid to be ingested into at least one of a compressor section and a fan area of said engine.

8. A system according to claim 1, further comprising means for filtering said collected liquid to remove solid particulate and oils.

9. A system according to claim 8, further comprising means for treating said collected liquid to remove dissolved solids.

10. A system according to claim 1, wherein said collecting means comprises said effluent trough being within said cart.

11. A system according to claim 10, wherein said collecting means further comprises a collection conduit connected to said exit end of said engine and wherein said collection conduit has an outlet for allowing collected liquid to flow into said effluent trough.

12. A system according to claim 10, further comprising a mobile unit containing means for treating said collected liquid and a collection tank.

13. A system according to claim 12, further comprising a pump for moving collected cleaning liquid from said effluent trough to said treating means.

14. A system according to claim 1, further comprising a heater for heating the cleaning liquid prior to introducing said liquid into the engine.

15. A system for on-wing engine washing and water reclamation, said system comprising:
    means for introducing a cleaning liquid containing at least water into an engine while said engine is being operated and is uncovered;
    mobile means for collecting said cleaning liquid from an exit end of said engine and from underneath said engine;
    said mobile collecting means comprising a cart having an open effluent trough positioned directly beneath said engine to collect cleaning liquid comprising an air/water effluent from the exit end of said engine and to collect in a hoseless manner cleaning fluid coming off an underneath portion of the engine; and
    wherein as said engine is operated, an airstream is created through said engine, thereby entraining cleaning liquid into said airstream, and said collecting means comprising an inertial separation system for separating the entrained cleaning liquid from said airstream prior to delivering said entrained cleaning liquid to said trough.

16. A system for on-wing engine washing and water reclamation, said system comprising:
    means for introducing a cleaning liquid containing at least water into an engine while said engine being operated, wherein as said engine is operated, an airstream is created through said engine, thereby entraining cleaning liquid into said airstream; and
    a collection conduit in contact with at least an exhaust nozzle of the engine for receiving the entrained cleaning liquid, said collection conduit receiving at least a portion of said exhaust nozzle, the collection conduit comprising an inertial separation system for separating the entrained cleaning liquid from said airstream and for depositing said separated entrained cleaning liquid into an open effluent trough positioned beneath said engine.

* * * * *